UNITED STATES PATENT OFFICE.

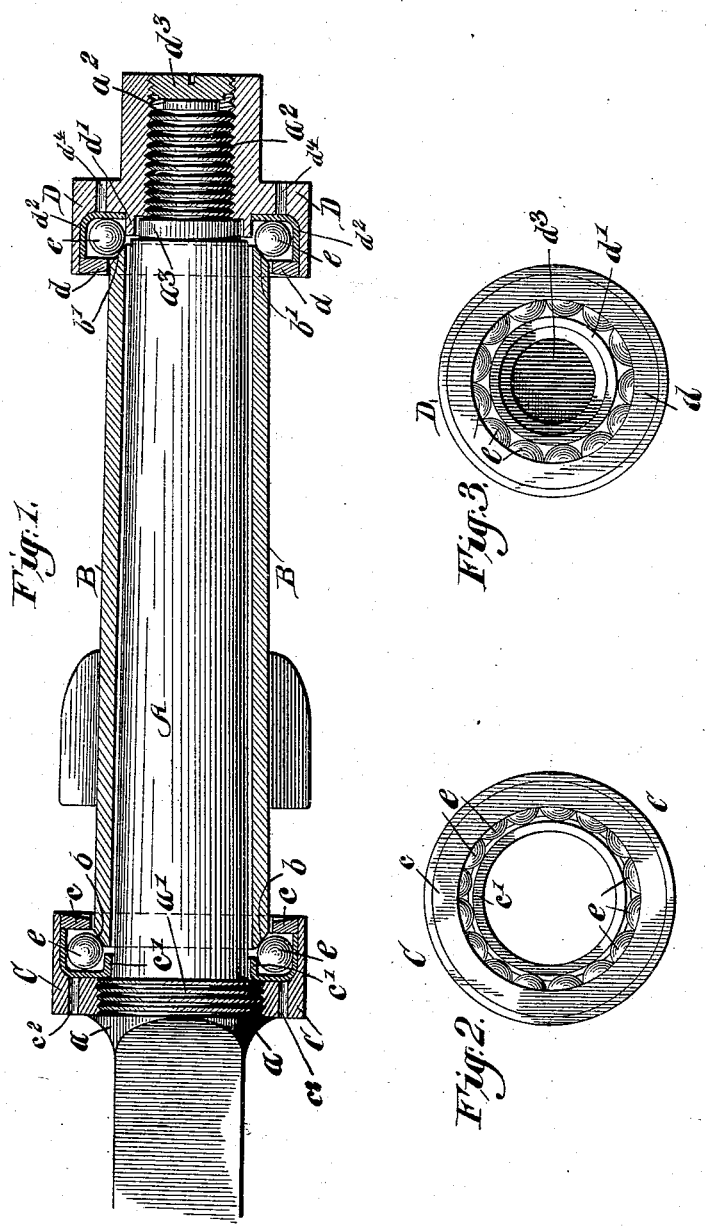

FREDERICK RUPP, OF NAPPANEE, AND HENRY J. MILLER, OF FORT WAYNE, INDIANA.

BALL-BEARING VEHICLE-AXLE.

SPECIFICATION forming part of Letters Patent No. 551,874, dated December 24, 1895.

Application filed March 28, 1895. Serial No. 543,492. (No model.)

*To all whom it may concern:*

Be it known that we, FREDERICK RUPP, of Nappanee, in the county of Elkhart, and HENRY J. MILLER, of Fort Wayne, in the county of Allen, State of Indiana, have invented a new and useful Improvement in Ball-Bearing Vehicle-Axles, of which the following is a specification.

Our invention is in the nature of a ball-bearing vehicle-axle designed mainly for buggies, carriages, and light-running vehicles, but applicable to all kinds of axles; and it consists in a peculiar construction and arrangement of axle-arm, axle-box, and removable collar and nut, in which the collar and nut are made to form ball cages or races, which are normally stationary upon the axle and entirely independent of the box and hub, which latter are arranged to revolve with an endwise bearing against the balls, which are retained in the collar and nut by a ring placed in lateral openings in the same, which ring reduces the lateral openings to a smaller transverse dimension than the diameter of the balls, so that when the wheel is taken off it is entirely separate from the ball-bearings and the balls are not allowed to drop out.

Figure 1 is a longitudinal section taken through the axle-box and the collar and nut containing the ball-bearings. Fig. 2 is an inside face view of the removable collar, and Fig. 3 is an inside face view of the removable nut.

In the drawings, A represents the axle-arm, and B is the axle-box. The arm A has at its inner end a screw-threaded enlargement $a'$ and behind this a shoulder $a$. Onto this screw-threaded enlargement and against the shoulder $a$ is screwed the removable collar C, which has a laterally-opening annular channel filled with hardened steel balls $e$ held in the channel by a ring $c$, which is pressed or swaged into the inner edge of the collar, or otherwise held there in a rigid but detachable manner. These balls are held in place by this ring $c$ in conjunction with another detachable ring $c'$, which latter is made in the form of a detachable ball or race capable of being knocked out by a nail or tool inserted in holes $c^2$. The annular opening between the rings $c$ and $c'$ is less than the diameter of the balls, so that the latter are prevented from falling out, but is wide enough to permit of the entrance of the conical end of the box B, which thus finds a bearing against the balls at $b$. The outer end of the box is also made conical, as at $b'$, and finds a bearing against another series of hardened steel balls $e$ retained in a laterally-opening annular channel in the nut D. This nut D is screw-threaded interiorly to fit upon the screw-stem $a^2$ of the axle-arm and has its outer end closed by an adjustable and detachable screw-plug $d^3$. This screw-plug when screwed out slightly changes location of bearing of balls on conical surfaces of boxes and serves to adjust the balls to the axle-box. In the inner face of this nut is formed the annular channel for the steel balls $e$. This channel has a detachable retaining-ring $d$ swaged or pressed into the inner edge of the nut, and has also a detachable steel ball-race $d^2$ and a retaining-flange $d'$ formed upon the nut, the flange $d'$ and ring $d$ approaching each other closely enough to prevent the balls from coming out, and yet leaving sufficient space between to permit of the protrusion of the conical end $b'$ of the axle-box through the same so as to come into bearing contact with the balls. This detachable ball-race $d^2$ is, like the ball-race of the collar, dislodged by a nail or tool inserted in holes $d^4$ in the nut. The end of the axle-arm next to its screw-stem $a^2$ is also recessed at $a^3$ to accommodate the flange $d'$ of the nut which overlaps the end of the axle-arm and strengthens this joint.

The boxes B may have their conical ends at $b$ and $b'$ simply hardened, or if desired these ends may be made detachable and fastened on the ends of the boxes in the form of sleeves or caps that are shrunk, screwed, or otherwise fastened on.

With respect to the collar C it will be seen that it is not only detachable from the axle, but its retaining-ring $c$ and ball-race $c'$ being also detachable, the balls or race $c'$ may be easily taken out and renewed when worn. The enlarged portion $a$ (which is screw-threaded) also reinforces the axle-arm at this point and gives it greater strength.

The nut D has its retaining-ring $d$ made detachable to permit of the renewal of the balls, and ball-race $d^2$ and its flange $d'$ overlapping the recess $a^3$ of the end of the axle makes a strong joint at this point.

By means of the collar C and nut D channeled as described and provided with hardened steel ball-races and the retaining-rings, very convenient and suitable ball-bearings are formed for the two ends of the axle-arm, and only a very slight change in the axle-boxes is required, being in fact only the forming of conical ends on the same. These conical ends protruding into the ring of balls not only relieve the end friction, but also cause the balls to sustain the weight in vertical direction so that there is practically no weight carried by the intermediate horizontal parts of the axle-arm and box.

It will be seen that in our invention the inner ball-bearing is completely formed by a removable collar on the inner end of the axle-arm, which collar is normally stationary and fixed to said arm, is wholly disconnected from the hub and box, and retains its balls after the wheel with its hub and box are taken off. The other ball-bearing is completely formed by the removable nut on the outer end of the axle-arm which complete ball-bearing, retaining its own balls when taken off, is also wholly independent of the hub and box of the wheel and is normally stationary upon the axle-arm. By this construction any vehicle-axle bearing may with but little alteration be easily equipped with ball-bearings, the balls not being located on the hub or box at all and being retained against dropping out when the wheel is taken off.

Having thus described our invention, what we claim as new, and desire to secure by Letters Patent, is—

1. An axle bearing, consisting of an axle arm with nut and collar, an axle box inclosing said arm and provided with conical or beveled ends, ball races arranged in said collar and nut independently and separate from said box, having each an annular opening in its side, a series of anti-friction balls arranged in each of said annular openings and adapted to bear against the conical or beveled ends of the axle box, and means for retaining the balls in the races, substantially as shown and for the purpose described.

2. An axle bearing, consisting of an axle arm, having a collar on its inner end provided with a laterally opening annular channel or ball race, a series of anti-friction balls arranged and retained in said channel as shown, a nut screwed upon the outer end of said axle arm provided also with a laterally opening annular channel or ball race, with a series of anti-friction balls arranged in said channel, and means for retaining said balls in their races, in combination with an axle box inclosing said axle arm and having conical or beveled ends adapted to be received in the openings in said channels and bearing outwardly against the anti-friction balls therein and supported upon the same when the said nut is screwed upon the axle arm, substantially as shown and for the purpose described.

3. The combination of an axle arm having a screw threaded end, an axle nut D, provided with a ball race with a series of anti-friction balls arranged therein, means for retaining the balls therein as shown, and a central screw plug $d^3$ in outer end of said nut to regulate and adjust the bearing or contact of the anti-friction balls on the ends of the axle box, substantially as shown and for the purpose described.

FREDERICK RUPP.
HENRY J. MILLER.

Witnesses:
C. B. PHILLIPS,
W. H. BAKER.